Figure 1:
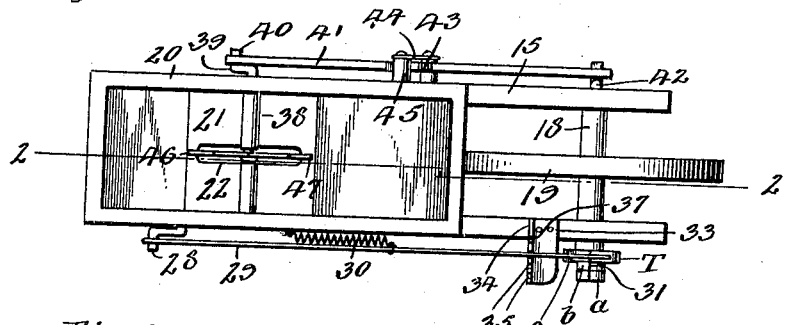

R. H. PRIOR.
SEED PLANTER.
APPLICATION FILED MAR. 10, 1914.

1,103,831.

Patented July 14, 1914.
2 SHEETS—SHEET 1.

Witnesses

Inventor
R. H. Prior,
By Victor J. Evans
Attorney

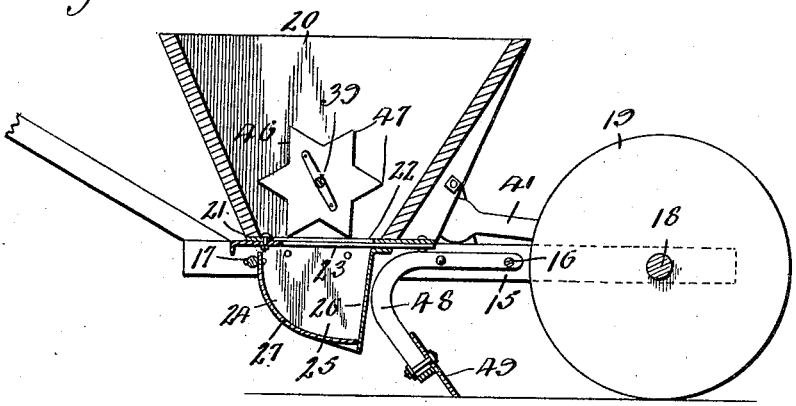
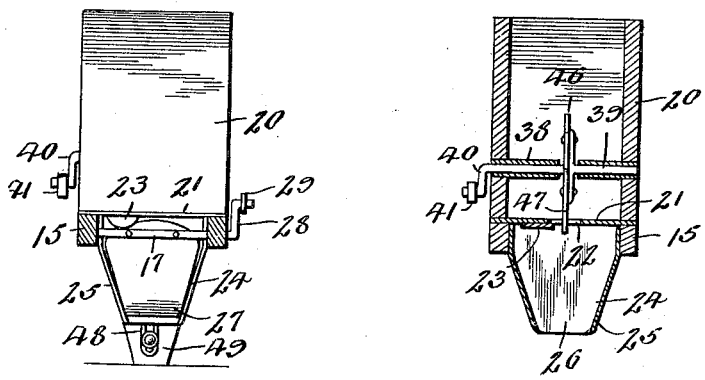
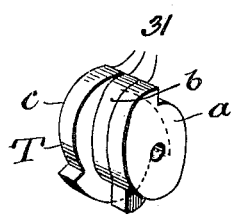

UNITED STATES PATENT OFFICE.

ROBERT H. PRIOR, OF CEDARTOWN, GEORGIA, ASSIGNOR OF ONE-HALF TO AUGUSTIN E. YOUNG, OF CEDARTOWN, GEORGIA.

SEED-PLANTER.

1,103,831.  Specification of Letters Patent. Patented July 14, 1914.

Application filed March 10, 1914. Serial No. 823,762.

*To all whom it may concern:*

Be it known that I, ROBERT H. PRIOR, an American-born citizen of the United States, residing at Cedartown, in the county of Polk and State of Georgia, have invented new and useful Improvements in Seed-Planters, of which the following is a specification.

This invention relates to seed planters and particularly to a machine for planting cotton seed and oats.

One object of the invention is to produce a planter of simple and improved construction which will be capable of planting cotton seed or oats in drills and which by a slight change may be used for planting cotton seed in hills suitably spaced apart according to the nature of the seed as well as the soil to properly space the stands apart.

A further object of the invention is to simplify and improve the means for actuating the seed dropping mechanism.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 3:
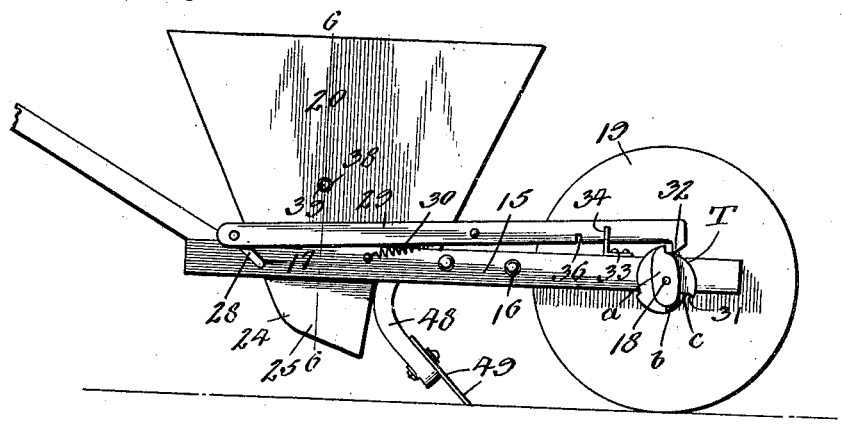
Figure 4:
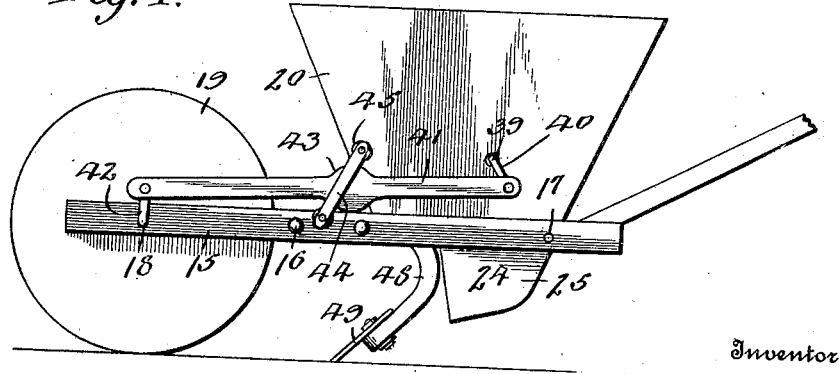

Figure 1 is a top plan view of a machine constructed in accordance with the invention. Fig. 2 is a longitudinal sectional view of the same taken on the line 2—2 in Fig. 1. Fig. 3 is a side elevation. Fig. 4 is a side elevation showing the opposite side of the machine. Fig. 5 is a rear elevation. Fig. 6 is a transverse sectional view taken on the line 6—6 in Fig. 3. Fig. 7 is a perspective detail view of the cam for actuating the drop valve and related parts.

Corresponding parts in the several figures are denoted by like characters of reference.

The frame of the machine includes the side members or sills 15 which are connected and spaced apart at suitable intervals by cross bars or rods 16, 17, the latter being positioned adjacent to the rear ends of the sills. The sills, near their forward ends, afford bearings for the axle 18 carrying a ground wheel 19 which by engagement with the ground causes the rotation of the axle.

The frame supports a hopper 20, the bottom of which, 21, has a longitudinal slot 22 for the escape of seed, said slot being regulated by means of a gate 23. Extending downwardly from the bottom of the hopper is a discharge spout 24 comprising side walls 25 and a front wall 26, said spout being thus approximately U-shaped in horizontal section, the lower end and the rearward portion of said spout being open. The rearward cross bar 17 is pivoted on the sills so as to be capable of rocking movement, and mounted on said cross bar is a tongue 27 adapted to constitute a closure for the rear and lower portions of the discharge spout. The cross bar 17 has at one end a crank 28 on which is pivoted a forwardly extending rod 29 which is normally retracted by a spring 30 which serves to keep the tongue 27 normally in an obstructing position with respect to the spout. The axle 18 carries at one end a tappet disk T which may be described as having a plurality of series of cams $a$, $b$, $c$ arranged side by side and containing different numbers of equidistantly spaced cam members 31, it being understood that the first so-called series may include but a single cam member, while the next series may include two such cam members, oppositely disposed, while a third series may include three equidistantly spaced cam members, and so on. The cam members of each series are adapted for engagement with a lug 32 that depends from the forward end of the rod 29. Secured on one of the sills 15 is a plate 33 having an upstanding flange 34 provided with notches 35 in one of which the rod 29 may be guided, said notches being disposed in alinement with the several cam series $a$, $b$, $c$, so that by proper adjustment of the rod 29 in one of said notches the lug 32 may be placed in the path of the cams of any predetermined series, thereby causing the rod 29 and the tongue or valve 27 controlled thereby to be actuated a predetermined number of times during each rotation of the axle, the frequency of such rotation being governed by the diameter of the ground wheel. The rod 29 has a notch 36 which may be placed in engagement with a notch 37 in the flange 34 when it is desired to support the rod in such a manner that it will not be actuated by the tappet disk.

The side walls of the hopper 20 support tubular bearings 38 for a shaft 39 having at one end a crank 40 which is connected by a pitman 41 with a crank 42 on the axle 18. The cranks 40 and 42 are of equal radius in order that rotary motion may be transmitted from the axle to the shaft 39, and in order to prevent the shaft 39 from hanging on a dead center the pitman is provided intermediate its ends with a bulged portion 43, said intermediate portion being guided through a keeper 44, the end portions of which are equipped with antifriction members 45. Owing to this construction it will be seen that when the crank 42 on the axle approaches a dead center, where it will lie in alinement with the axis of the shaft 39, the bulging portion 43 passing in engagement with one of the anti-friction members or rollers 45 will serve to constitute a fulcrum that enables the pitman to perform a rocking movement of sufficient scope to swing the crank 40 beyond a dead center, and thus enabling the shaft 39 to continue its rotary motion; it being, of course, understood that the cranks 42 and 40 will simultaneously approach the dead center. The shaft 39 carries within the hopper an agitating disk 46 having laterally extending arms 47 to stir and agitate the contents of the hopper and to feed it through the slot 22 in the bottom thereof.

Securely mounted on the frame is a standard 48 of the customary U-shaped form, sometimes known as the "Georgia" plow foot, and on which a furrow opener 49 may be adjustably mounted. It is obvious that the said furrow opener may be of any shape or type that may be considered most advantageous for the work to be performed.

From the foregoing description taken in connection with the drawings hereto annexed, it will be seen that by placing the lug 32 in the path of one of the cam series a, b, c the tongue or closure 27 may be actuated a predetermined number of times during each rotation of the axle. At the same time the rotation of the axles imparts a rotary motion to the shaft 39 in the hopper, causing the contents of the latter to be fed through the slot 22, the area of which may be regulated by proper adjustment of the gate 23. In this manner cotton seed may be planted at suitable intervals, it being seen that a portion of cotton seed will accumulate on the tongue or closure 27 and caused to drop from the latter into the furrow at each operation of the spring retracted rod 29. Should it be desired to drill oats or cotton seed, the closure or tongue 27 may be latched in an open position, when the contents of the hopper will be fed in a continuous stream to the furrow.

Having thus described the invention, what is claimed as new, is:—

1. In a planter, a discharge spout having an opening, a pivoted member carrying a tongue to obstruct said opening, said pivoted member having a crank at one end, an axle, a tappet member on the axle, and a spring retracted rod connected pivotally at one end with the crank on the pivoted member and having at the other end a lug positioned in the path of the tappet member.

2. In a seed planter, a discharge spout, a pivoted member having a crank at one end, a tongue secured on the pivoted member and constituting a closure for the spout, a spring retracted rod connected pivotally at one end with the crank on the pivoted member, and means for actuating the rod at predetermined intervals.

3. In a planter, a discharge spout, a pivoted member having a closure for said spout, and a crank at one end, a spring retracted rod connected pivotally with the crank, a tappet member supported for rotation and including a plurality of cam series having various numbers of cams arranged side by side, a plate fixed on the frame of the planter and having an upstanding flange with a plurality of notches arranged in alinement with the cam series, a lug depending from the spring and adapted to lie in the path of one of the cam series, the spring retracted rod being guided through one of the notches in the flanges, said flange and rod being also provided with interengaging notches whereby the rod may be supported with the lug out of the path of any of the cam series.

4. In a planter, a hopper having a shaft supported for rotation and provided with a crank at one end, an axle carrying a ground wheel and having a crank at one end, a pitman connecting the two cranks and having an intermediate bulged portion, and a keeper through which the pitman is guided, the end portions of said keeper being provided with anti-friction members.

In testimony whereof I affix my signature in presence of two witnesses.

ROBERT H. PRIOR.

Witnesses:
J. T. WEST,
E. C. BENTON.

---

Copies of this patent may be obtained for five cents each, by addressing the "Commissioner of Patents, Washington, D. C."